US011988450B2

United States Patent
Hannah et al.

(10) Patent No.: US 11,988,450 B2
(45) Date of Patent: May 21, 2024

(54) COOKING APPLIANCE HAVING AN IMAGING DEVICE FOR IDENTIFYING A TYPE OF TEMPERATURE SENSING DEVICE

(71) Applicant: Haier US Appliance Solutions, Inc., Wilmington, DE (US)

(72) Inventors: Sabrina Marie Hannah, Louisville, KY (US); Amelia Lear Hensley, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 574 days.

(21) Appl. No.: 17/117,770

(22) Filed: Dec. 10, 2020

(65) Prior Publication Data

US 2022/0187022 A1    Jun. 16, 2022

(51) Int. Cl.
| | |
|---|---|
| *F27D 21/02* | (2006.01) |
| *F24C 3/12* | (2006.01) |
| *F24C 7/08* | (2006.01) |
| *G06V 20/00* | (2022.01) |
| *H04N 7/18* | (2006.01) |
| *H04N 23/54* | (2023.01) |

(52) U.S. Cl.
CPC ............. *F27D 21/02* (2013.01); *F24C 3/126* (2013.01); *F24C 7/082* (2013.01); *G06V 20/00* (2022.01); *F27D 2021/026* (2013.01); *H04N 7/18* (2013.01); *H04N 23/54* (2023.01)

(58) Field of Classification Search
CPC .......... F24C 7/085; F24C 7/087; F24C 7/082; H04N 23/57; H04N 7/18
See application file for complete search history.

(56) References Cited

U.S. PATENT DOCUMENTS

| | | | |
|---|---|---|---|
| 9,494,322 B2 | 11/2016 | Luckhardt | |
| 9,644,847 B2 | 5/2017 | Bhogal | |
| 10,674,569 B2 | 6/2020 | Kersten | |
| 2020/0025387 A1* | 1/2020 | Suel, II | ................... F24C 7/083 |

FOREIGN PATENT DOCUMENTS

| | | | |
|---|---|---|---|
| EP | 3715720 A1 * | 9/2020 | |
| EP | 3715720 A1 | 9/2020 | |

* cited by examiner

*Primary Examiner* — Thien S Tran
(74) *Attorney, Agent, or Firm* — Dority & Manning, P.A.

(57) ABSTRACT

A cooking appliance assembly includes a cooking appliance having a heat source for heating at least one food item, a temperature sensing device, an imaging device for collecting data relating to the temperature sensing device, and a controller communicatively coupled with the cooking appliance assembly, the temperature sensing device, and the imaging device. The controller includes at least one processor for performing one or more operations, including but not limited to determining a type of the temperature sensing device based, at least in part, on the collected data relating to the temperature sensing device from the imaging device.

12 Claims, 7 Drawing Sheets

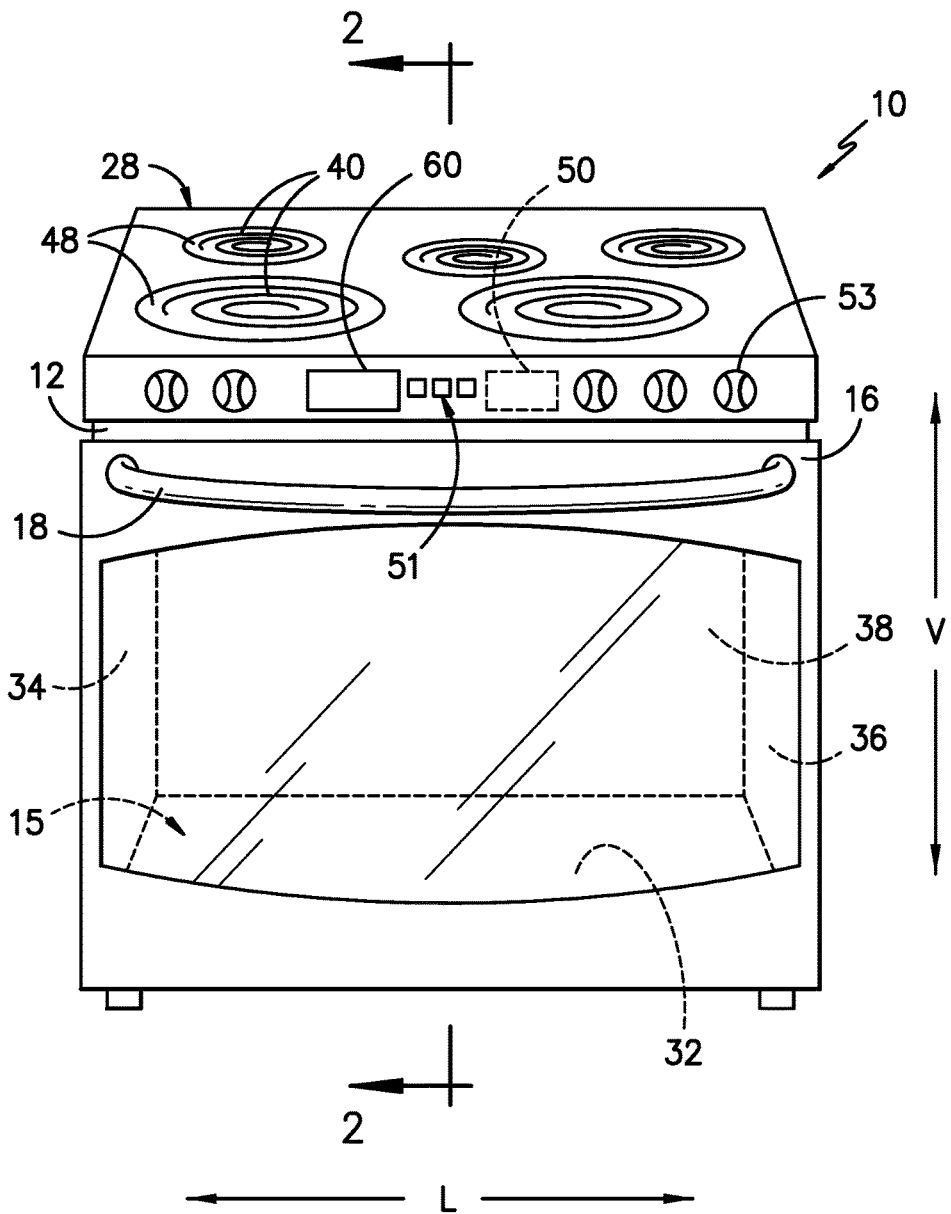
FIG. -1-

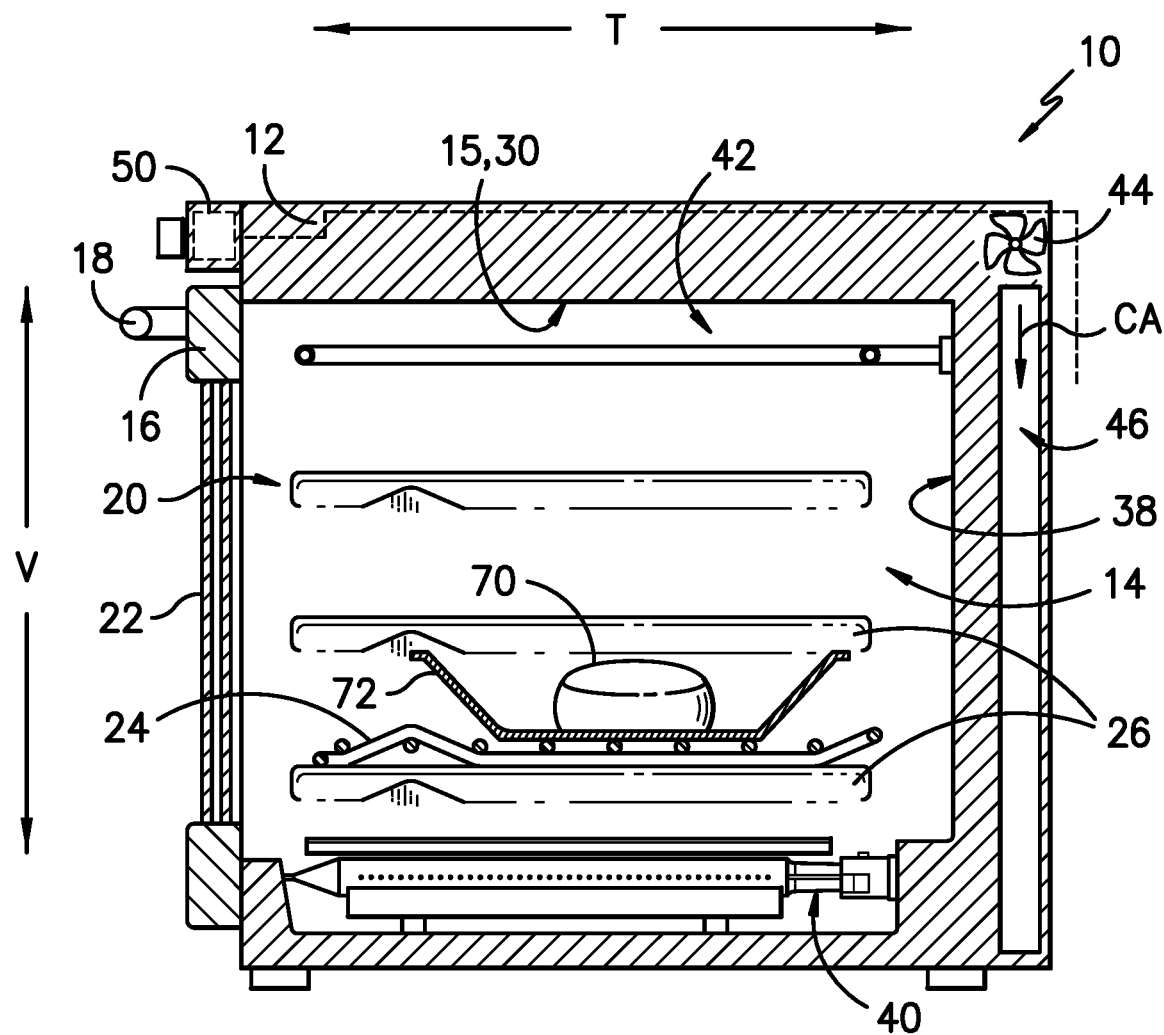
FIG. -2-

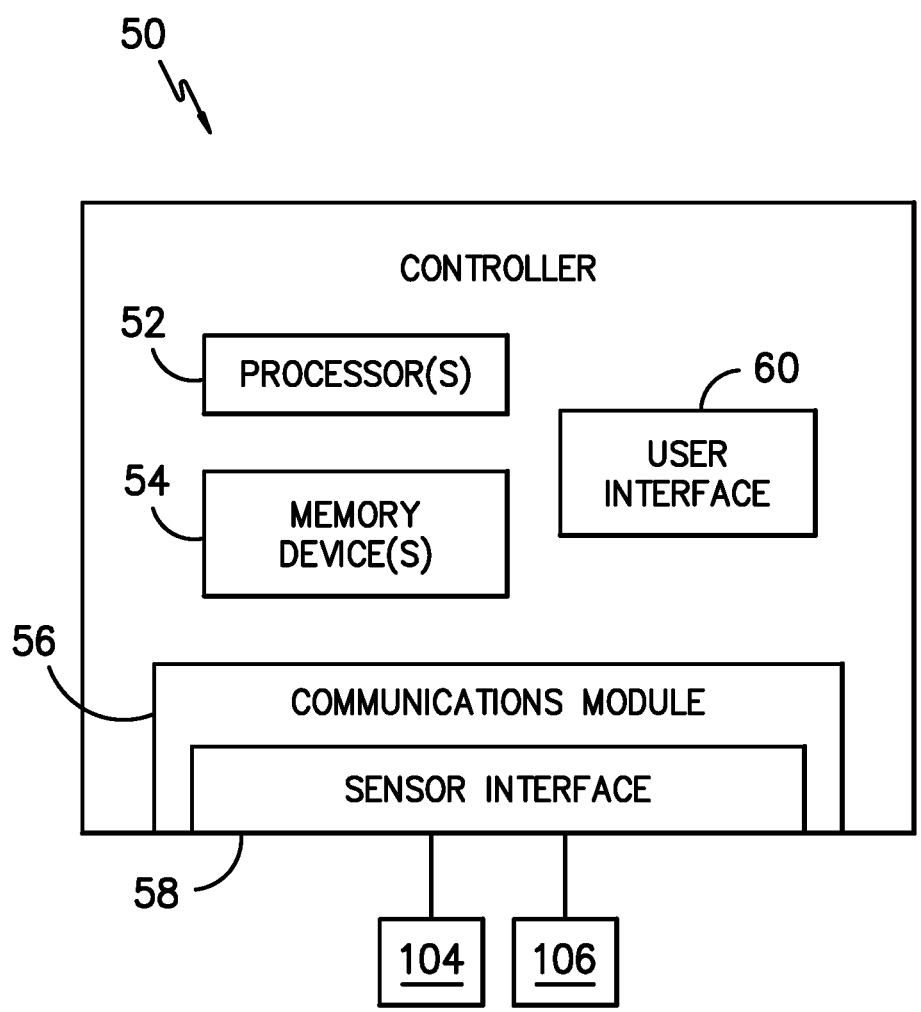
FIG. -3-

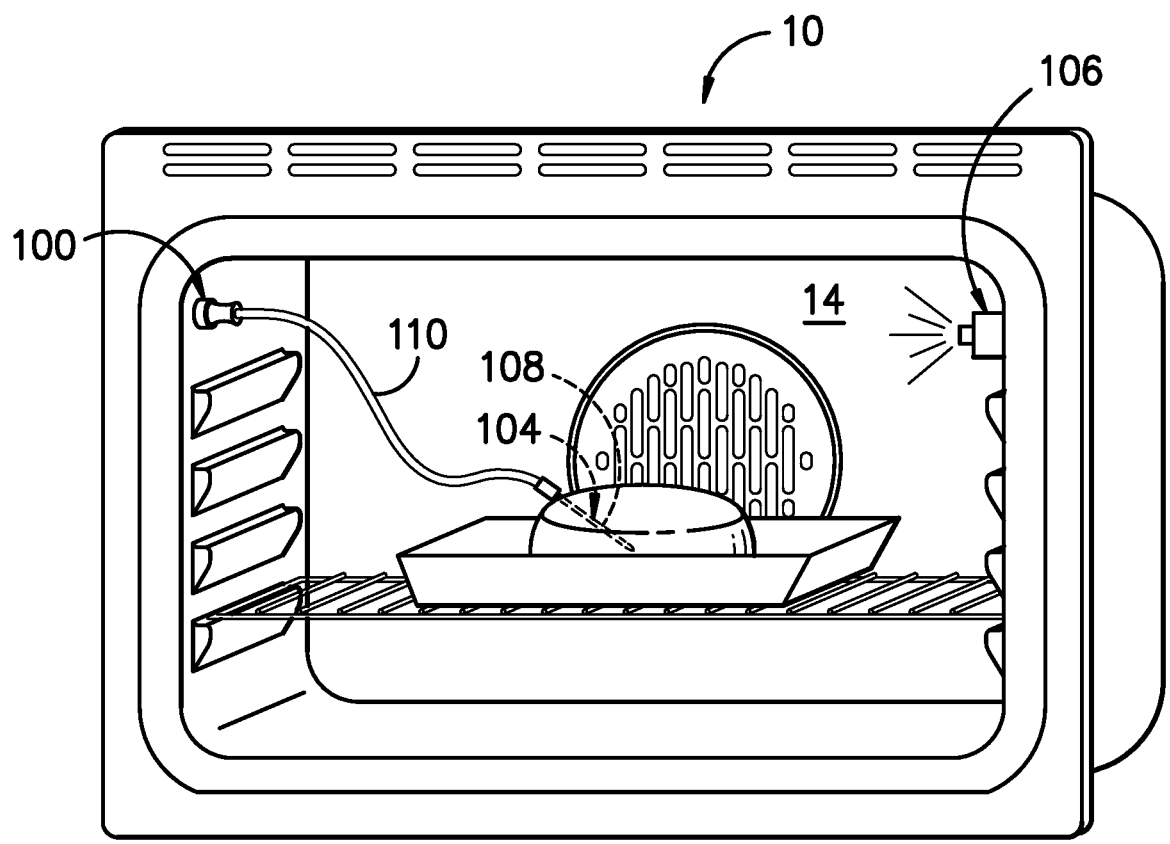
FIG. -4-
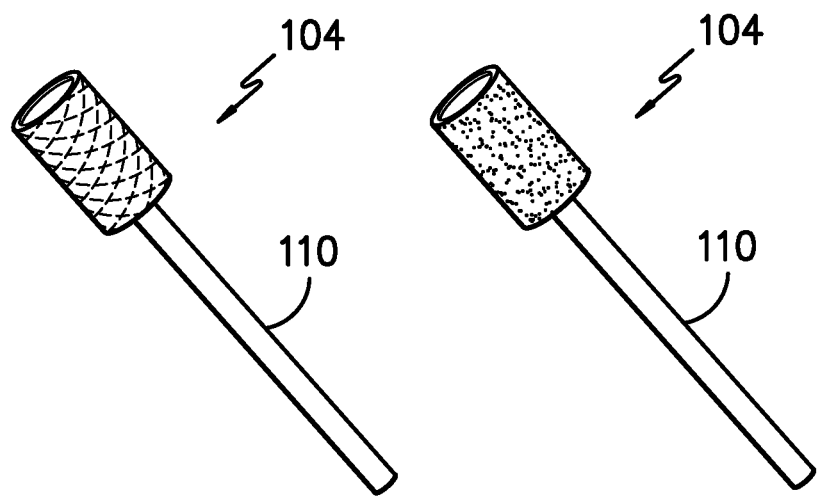
FIG. -5-

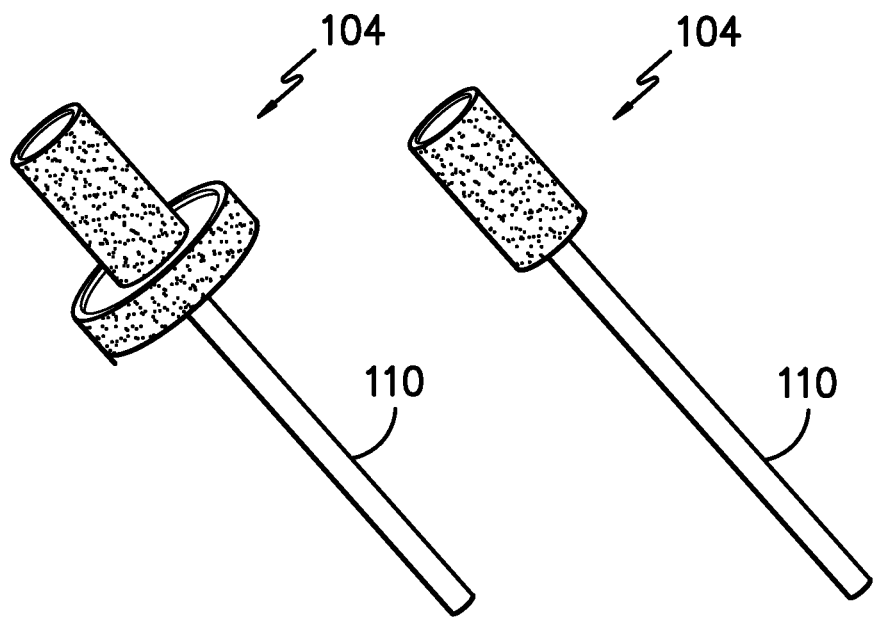
FIG. -6-
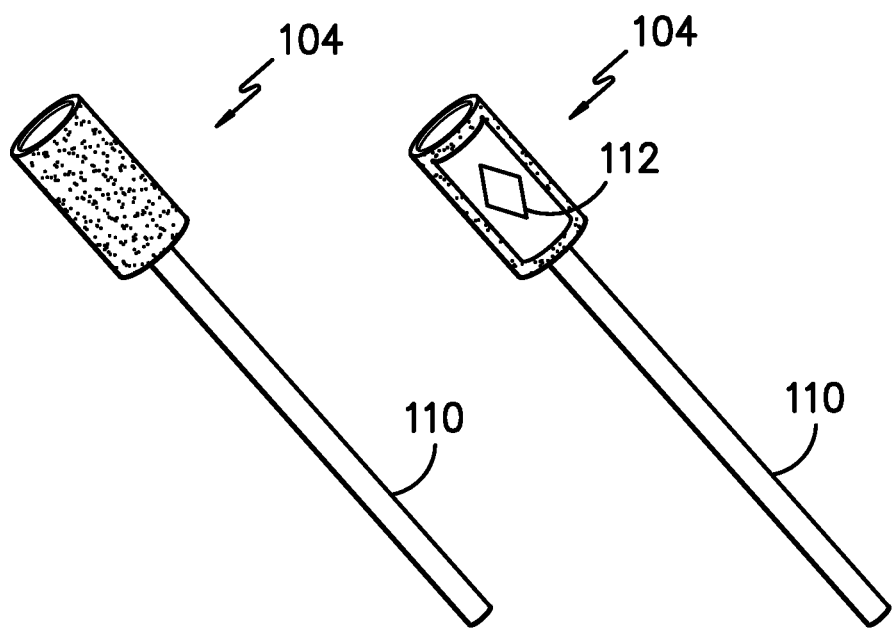
FIG. -7-

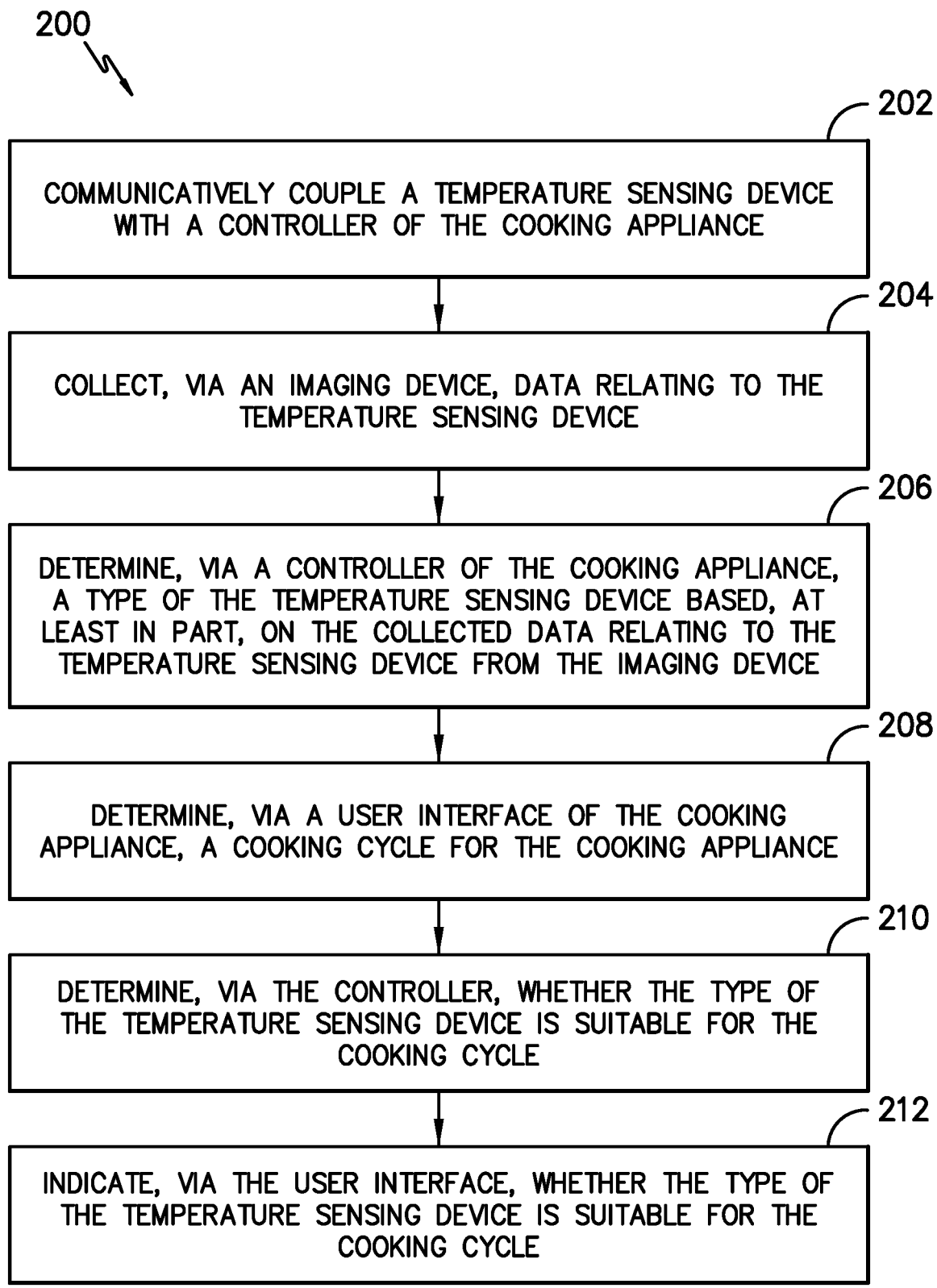
FIG. -8-

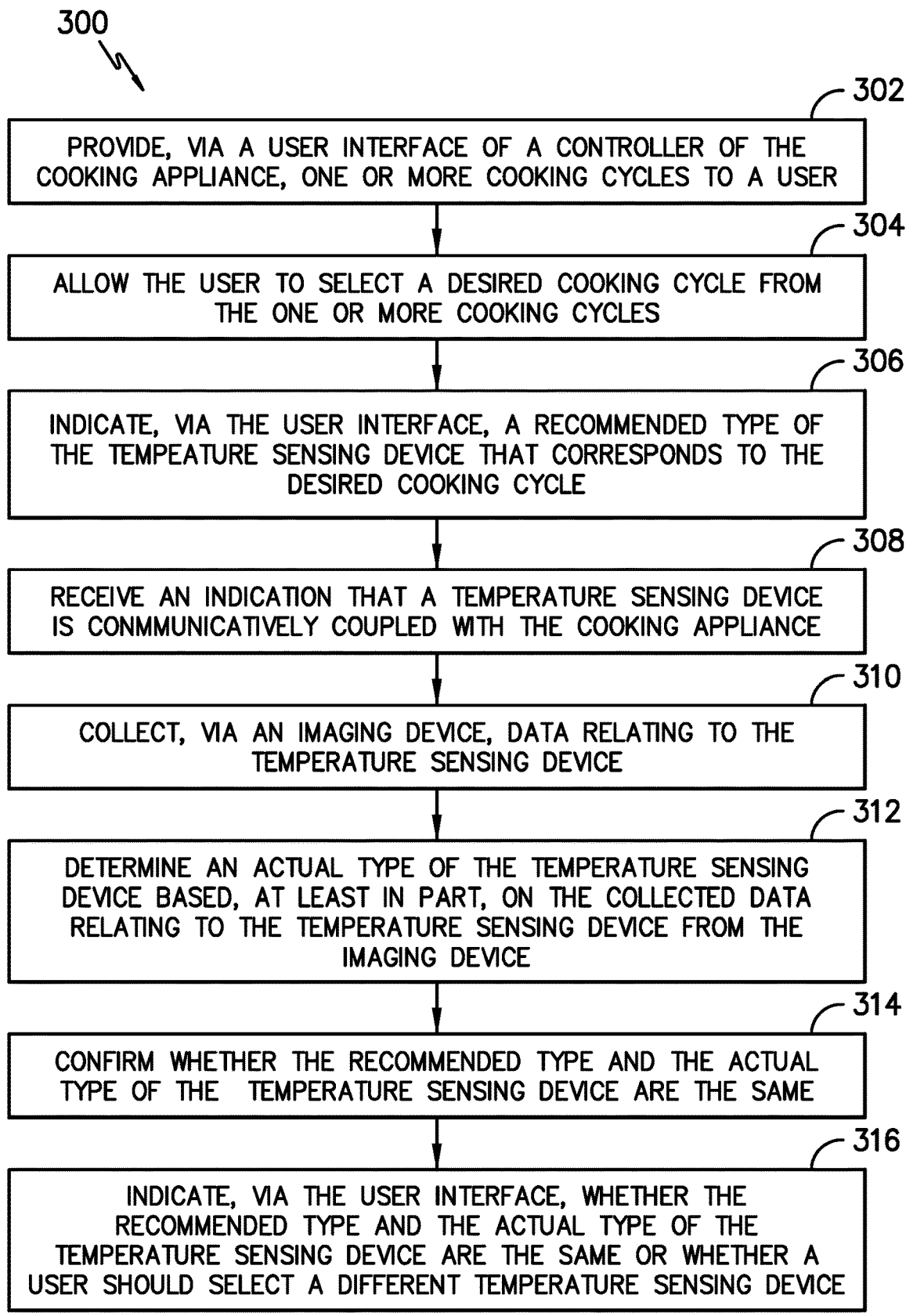
FIG. -9-

COOKING APPLIANCE HAVING AN IMAGING DEVICE FOR IDENTIFYING A TYPE OF TEMPERATURE SENSING DEVICE

FIELD OF THE INVENTION

The present subject matter relates generally to cooking appliances, and more particularly to cooking appliances having an imaging device for identifying a type of a temperature sensing device.

BACKGROUND OF THE INVENTION

Conventional residential and commercial oven appliances generally include a cabinet that defines a cooking chamber for receipt of food items for cooking. Heating elements are positioned within the cooking chamber to provide heat to food items located therein. The heating elements can include, for example, radiant heating elements, such as a bake heating assembly positioned at a bottom of the cooking chamber and/or a broil heating assembly positioned at a top of the cooking chamber. Certain oven appliances may also include a cooktop having one or more burners for cooking. Such cooktops may be part of the oven appliance or may also be a separate component.

When cooking certain food items, it may be important to check or monitor the temperature within the cooking chamber or on the cooktop, as well as the temperature of the food item, e.g., in order to ensure the food item is adequately cooked. As such, certain oven appliances include a temperature sensor for sensing the temperature within the cooking chamber. For example, the temperature sensor can be a resistance temperature detector (RTD), thermistor, or thermocouple located within a conductive sheath that extends into the cooking chamber. The temperature sensor is typically electrically insulated from the temperature sensor housing. Moreover, certain oven appliances include a probe assembly that generally includes a temperature probe configured for insertion into a food item for sensing the temperature of the food item, a wire or antenna that sends signals to and receives signals from the temperature probe, and a controller in communication with the wire/antenna to interpret the signals such that the temperature of the food item may be displayed or communicated to a user.

Different cooking activities may require different temperature sensors. For example, temperature probes for oven use often rely on thermistors. Thermistor technology is such that different applications may require different thermistor types for appropriate accuracy in the desired range of use. For example, cooking a roast beef to a rare doneness may require high accuracy at temperatures ranging from about 120° F. to about 130° F., while cooking a baked good may require high accuracy in the 180° F. to 205° F. temperature range. Thus, in situations where different temperature sensors are required, it is necessary to identify the type of sensor or sensing device in use in order to deliver the targeted outcome.

Accordingly, cooking appliances having an imaging device for identifying a type of a temperature sensing device would be useful.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a cooking appliance assembly. The cooking appliance assembly includes a cooking appliance having a heat source for heating at least one food item, a temperature sensing device, an imaging device for collecting data relating to the temperature sensing device, and a controller communicatively coupled with the cooking appliance assembly, the temperature sensing device, and the imaging device. The controller includes at least one processor for performing one or more operations, including but not limited to determining a type of the temperature sensing device based, at least in part, on the collected data relating to the temperature sensing device from the imaging device.

In another aspect, the present disclosure is directed to a method for operating a cooking appliance. The method includes communicatively coupling a temperature sensing device with a controller of the cooking appliance. The method also includes collecting, via an imaging device, data relating to the temperature sensing device. Further, the method includes determining, via a controller of the cooking appliance, a type of the temperature sensing device based, at least in part, on the collected data relating to the temperature sensing device from the imaging device. Moreover, the method includes determining, via the controller, a cooking cycle for the cooking appliance. In addition, the method includes determining, via the controller, whether the type of the temperature sensing device is suitable for the cooking cycle.

In yet another aspect, the present disclosure is directed to a method for operating a cooking appliance. The method includes providing, via a user interface of a controller of the cooking appliance, one or more cooking cycles to a user. The method also includes allowing the user to select a desired cooking cycle from the one or more cooking cycles. Further, the method includes indicating, via the user interface, a recommended type of the temperature sensing device that corresponds to the desired cooking cycle. Moreover, the method includes receiving an indication that a temperature sensing device is communicatively coupled with the cooking appliance. In addition, the method includes collecting, via an imaging device, data relating to the temperature sensing device. The method further includes determining an actual type of the temperature sensing device based, at least in part, on the collected data relating to the temperature sensing device from the imaging device. Thus, the method also includes confirming whether the recommended type and the actual type of the temperature sensing device are the same.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 illustrates a front perspective view of an oven appliance according to example embodiments of the present disclosure;

FIG. 2 illustrates a cross-sectional view of the example oven appliance of FIG. 1 taken along the line 2-2 of FIG. 1;

FIG. 3 illustrates a block diagram of one embodiment of a controller of a cooking appliance according to the present disclosure;

FIG. 4 illustrates a front, perspective view of one embodiment of a cooking appliance having an adaptable port according to the present disclosure;

FIG. 5 illustrates a perspective view of one embodiment of temperature sensing devices according to the present disclosure, particularly illustrated sensing devices distinguished by color;

FIG. 6 illustrates a perspective view of one embodiment of temperature sensing devices according to the present disclosure, particularly illustrated sensing devices distinguished by shape;

FIG. 7 illustrates a perspective view of one embodiment of temperature sensing devices according to the present disclosure, particularly illustrated sensing devices distinguished by a marker;

FIG. 8 illustrates a flow diagram of one embodiment of a method for operating a cooking appliance according to the present disclosure; and FIG. 9 illustrates a flow diagram of another embodiment of a method for operating a cooking appliance according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the figures, FIG. 1 illustrates a front perspective view of an exemplary cooking appliance assembly 10 (also referred to herein as simply a cooking appliance). FIG. 2 provides a cross-sectional view of the cooking appliance 10 taken along the line 2-2 of FIG. 1. As shown, the cooking appliance 10 defines a vertical direction V, a lateral direction L, and a transverse direction T. The vertical direction V, lateral direction L, and transverse direction T are mutually perpendicular and form an orthogonal direction system. As will be understood, the cooking appliance 10 is provided by way of example only, and the present subject matter may be used in any suitable oven appliance. Thus, the present subject matter may be used with other oven or range appliance configurations, e.g., that define multiple interior cavities for the receipt of food and/or having different configuration than what is shown in FIGS. 1 and 2.

Further, as shown, the cooking appliance 10 is an oven appliance and includes an insulated cabinet 12 that defines an oven cavity, such as a cooking chamber 14. More particularly, the cooking chamber 14 is defined by various interior surfaces 15 of the cabinet 12. The cooking chamber 14 is configured for the receipt of one or more food items (e.g., food item 70) to be cooked. Moreover, as shown, the cooking appliance 10 includes a door 16 rotatably mounted to the cabinet 12, e.g., with a hinge (not shown). A handle 18 is mounted to the door 16 and assists a user with opening and closing the door 16 in order to access the opening 20 to the cooking chamber 14. For example, a user can pull on the handle 18 to open or close the door 16 and access the cooking chamber 14 through the opening 20.

In addition, the cooking appliance 10 can include one or more seals (not shown) between the door 16 and the cabinet 12 that assist with maintaining heat and cooking fumes within the cooking chamber 14 when the door 16 is closed as shown in FIG. 2. Multiple parallel glass panes 22 provide for viewing the contents of cooking chamber 14 when the door 16 is closed and assist with insulating the cooking chamber 14. A baking rack 24 may also be positioned in the cooking chamber 14 for receipt of one or more food items (e.g., food item 70) and/or utensils (e.g., utensil 72) containing food items. In such embodiments, the baking rack 24 may be slidably received onto embossed ribs 26 or sliding rails such that the rack 24 may be conveniently moved into and out of the cooking chamber 14 when the door 16 is open.

As shown, various sidewalls of the cabinet 12 define the cooking chamber 14. For this embodiment, the cooking chamber 14 includes a top wall 30 (FIG. 2) and a bottom wall 32 (FIG. 1) which are spaced apart along the vertical direction V. Further, as shown, a left sidewall 34 and a right sidewall 36 (as defined according to a front view as shown in FIG. 1) extend between the top wall 30 and the bottom wall 32, and are spaced apart along the lateral direction L. Moreover, a rear wall 38 extends between the top wall 30 and the bottom wall 32 as well as between the left sidewall 34 and the right sidewall 36, and is spaced apart from the door 16 along the transverse direction T. As such, the cooking chamber 14 is thus defined between the top wall 30, the bottom wall 32, the left sidewall 34, the right sidewall 36, and the rear wall 38.

In some embodiments, a gas fueled or electric bottom heating element 40 (e.g., a heat source such as a gas burner or an electric heating element) is positioned in cabinet 12, e.g., at a bottom portion of the cabinet 12. Furthermore, as shown, the cooking appliance 10 may include a cooktop 28 having one or more burners 48. Accordingly, the bottom heating element 40 may be used to heat the cooking chamber 14 for both cooking and cleaning of cooking appliance 10. The size and heat output of the bottom heating element 40 can be selected based on the e.g., the size of the cooking appliance 10.

In yet other embodiments, a top heating element 42 may be positioned in the cooking chamber 14 of the cabinet 12, e.g., at a top portion of the cabinet 12. Thus, the top heating element 42 may be used to heat the cooking chamber 14 for both cooking/broiling and cleaning of the cooking appliance 10. Like the bottom heating element 40, the size and heat output of top heating element 42 can be selected based on the e.g., the size of the cooking appliance 10. In the example embodiment shown in FIG. 2, the top heating element 42 is shown as an electric resistance heating element. However, in alternative embodiments, a gas, microwave, halogen, or any other suitable heating element may be used instead of electric resistance heating element 42.

As further depicted in FIG. 2, the cooking appliance 10 may further include a cooling fan 44 (as well as convention fans and/or heaters (not shown)), in fluid communication with a cooling passage 46 defined by rear wall 38 of cabinet 12. The cooling fan 44 is configured to urge a cooling airflow CA through cooling passage 46 to assist with cooling of the rear portion of cooking appliance 10. Further, various electrical components may be positioned along the rear portion of the cooking appliance 10 and may be cooled by the cooling airflow CA. In this way, the relatively hot temperatures within the cooking chamber 14 do not melt or otherwise render the electrical components inoperable.

In certain embodiments, the cooking appliance 10 may also include a controller 50, e.g., configured to control one or more operations of the cooking appliance 10. For example, the controller 50 may control at least one operation of the cooking appliance 10 that includes one or more of heating elements 40 and 42. Further, the controller 50 may be in communication (via a suitable wired or wireless connection) with the heating element 40, the heating element 42, a user interface panel 51, a temperature sensing device, and other suitable components of the cooking appliance 10, as discussed herein. In general, the controller 50 may be operable to configure the cooking appliance 10 (and various components thereof) for cooking. Such configuration may be based, for instance, on a plurality of cooking factors of a selected operating cycle or mode, e.g., as selected at user interface panel 51.

By way of example, as shown in FIG. 3, there is illustrated a block diagram of one embodiment of various components of the controller 50 according to the present disclosure. As shown, the controller 50 may include one or more processor(s) 52 and associated memory device(s) 54 configured to perform a variety of computer-implemented functions (e.g., such as executing programming instructions or micro-control code associated with an operating cycle). The memory device(s) 54 (i.e., memory) may represent random access memory such as DRAM, or read only memory such as ROM or FLASH. In one embodiment, the processor(s) 52 executes programming instructions stored in the memory device(s) 54. The memory device(s) 54 may be a separate component from the processor(s) 52 or may be included onboard within the processor(s) 52. The memory device(s) 54 can store information accessible to processing device, including instructions that can be executed by processing device. Optionally, the instructions can be software or any set of instructions that, when executed by the processing device, cause the processing device to perform operations. For certain embodiments, the instructions include a software package configured to operate the cooking appliance 10 and interpret one or more electrical signals. For example, the instructions may include a software package configured to execute commands based on feedback from a probe and antenna device as described more fully below.

Additionally, the controller 50 may also include a communications module 56 to facilitate communications between the controller 50 and the various components of the cooking appliance 10. Further, the communications module 56 may include a sensor interface 58 (e.g., one or more analog-to-digital converters) to permit signals transmitted from the various components of the cooking appliance 10, e.g. via one or more temperature sensing devices 104 or an imaging device 106, to be converted into signals that can be understood and processed by the controller 50. It should be appreciated that the sensors may be communicatively coupled to the communications module 56 using any suitable means. For example, as shown, the devices 104, 106 are coupled to the sensor interface 89 via a wired connection. However, in other embodiments, the devices 104, 106 may be coupled to the sensor interface 58 via a wireless connection, such as by using any suitable wireless communications protocol known in the art. Furthermore, a sensor or sensing device, as used herein, generally refers to any devices which detects or measures a physical property (such as temperature), and records, indicates, or otherwise responds to such detection.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 85 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 85 may generally be configured to store suitable computer-readable instructions that, when implemented by the processor(s) 58, configure the controller 50 to perform various functions.

Furthermore, the controller 50 may be positioned in a variety of locations throughout the cooking appliance 10. As illustrated, the controller 50 may be located within the user interface panel 51 of the cooking appliance 10 as shown in FIGS. 1 through 2. In such embodiments, input/output ("I/O") signals may be routed between the controller 50 and various operational components of cooking appliance 10, such as heating element 40, heating element 42, controls 53, user interface 60, sensing devices, alarms, antennas, and/or other components as may be provided. For instance, signals may be directed along one or more wiring harnesses that may be routed through cabinet 12.

In some embodiments, the user interface panel 51 includes input components or controls 53, such as one or more of a variety of electrical, mechanical or electro-mechanical input devices. Controls 53 may include rotary dials, push buttons, and touch pads. Further, the controller 50 may be in communication with the user interface panel 51 and controls 53 through which a user may select various operational features and modes and monitor progress of the cooking appliance 10. In additional or alternative embodiments, the user interface panel 51 may include a display component 60 (or user interface), such as a digital or analog display in communication with controller 50 and configured to provide operational feedback to a user. In certain embodiments, user interface panel 51 represents a general purpose I/O ("GPIO") device or functional block. It should also be understood that the user interface 60 described herein may be a separate component remote from the controller 50, such as, for example, a smart phone or any other smart device that is capable of communicating with the controller 50.

Referring now to FIG. 4, a front, perspective view of the cooking appliance 10 of FIGS. 1 and 2 according to an exemplary embodiment of the present disclosure is illustrated. As mentioned, and as shown, the cooking appliance 10 may be an oven appliance having a cabinet 12 defining the cooking chamber 14 with the heat source 40 configured to heat the cabinet 12. In addition, or in the alternative, the cooking appliance 10 may be a cooktop appliance 28 having one or more burners 48, with the heat source 40 configured to heat the burner(s).

Accordingly, as shown in the illustrated embodiment, the cooking appliance 10 may also include a temperature sensing device 104, an imaging device 106 for collecting data relating to the temperature sensing device 104, and the controller 50 communicatively coupled with the cooking appliance 10, the temperature sensing device 104, and the imaging device 106. In certain embodiments, as an example, the temperature sensing device(s) 104 described herein may be a temperature probe having a thermistor or any other suitable sensor. Moreover, in an embodiment, the temperature sensing device(s) 104 described herein may include a food temperature sensor, a pan temperature sensor, a stone temperature sensor, a dish temperature sensor, a coffee roaster temperature sensor, or any other suitable temperature sensor now known or later developed in the art. Furthermore, in particular embodiments, the imaging device 106 may be a camera. More specifically, in certain embodiments, the imaging device 106 may be mounted within, atop, below, or adjacent to the cooking appliance 10. For example, in certain embodiments, the imaging device 106 may be secured above the burner(s) 48. In another embodiment, the imaging device 106 may mounted within the cabinet 102. In alternative embodiments, the imaging device 106 may be a camera that is part of a smart device or mobile application, such as smart phone.

Furthermore, as depicted particularly in FIG. 4, the temperature sensing device 104 may include a probe 108 configured to be inserted into a food item (or pan, dish, stone, etc.) placed within the cooking chamber 14 and is configured to send signals to and receive signals from the controller 50. Thus, to send and receive signals, the probe 108 may include a transmission device and a receiving device (not shown) for communication with the controller 50. In some embodiments, the probe 108 may include a transceiver device that combines transmitting and receiving functionality. More specifically, as shown, the probe 108 may be communicatively coupled with the controller 50 via a transmission cable 110. In addition, the probe 108 may send signals indicative of the internal temperature of the food item in which the probe 108 is inserted to the controller 50 such that the signal may be interpreted by the controller 50. In this way, the cooking appliance 10 may communicate the temperature of the food item to a consumer, e.g., by displaying the temperature on display component 60 (FIG. 1) (which is also referred to herein as a user interface).

Further, as shown, the cooking appliance 10 includes a port 100 for receiving a plug 102 of the temperature sensing device 104. Thus, as shown, the cooking appliance 10 can be compatible with a plurality of different types of temperature sensing devices 104 that can be plugged into the port 100 and/or may communicate with the controller 50 via wireless or Bluetooth communications. As such, the controller 50 is configured to determine a type of the temperature sensing device(s) 104 being used when a respective device is engaged with the port 100 based on e.g. the collected data relating to the temperature sensing device 104 collected by the imaging device 106. For example, in an embodiment, the collected data relating to the temperature sensing device 104 may include a structural feature of the temperature sensing device, color of the temperature sensing device, or a marker on the temperature sensing device 104. More particularly, as shown in as shown in FIG. 5, certain temperature sensing devices 104 may be distinguished from each other using different colors (as indicated via the different shading). Further, as shown in FIG. 6, differing temperature sensing devices 104 may be distinguished from each other using different shapes. Moreover, as shown in FIG. 7, differing temperature sensing devices 104 may be distinguished from each other by using a marker 112 or text.

Accordingly, in an embodiment, the memory device(s) 54 is configured to store reference data relating the type of the temperature sensing device 104. For example, colors, shapes, markers, etc. for each sensor type can be stored in the memory device(s) 54. Thus, in such embodiments, the controller 50 is configured to identify the type of the temperature sensing device 104 by correlating the collected data relating to the temperature sensing device 104 from the imaging device 106 and the stored reference data relating the type of the temperature sensing device 104. For example, in an embodiment, the memory device(s) 54 described herein may have at least one of a table or equation stored therein, such as a look-up table that relates the type of the temperature sensing device 104 with one or more corresponding cooking cycles. In certain embodiments, the table may be downloaded into the memory device(s) 54 of the controller 50 at any time. This feature allows for users to upgrade their cooking appliance 10 over time as new oven accessories are developed.

In addition, the memory device(s) 54 may include various cooking cycles stored therein that are associated with each type of temperature sensor device 104. Accordingly, in an embodiment, the controller 50 can identify one or more cooking cycles that correspond to the type of the temperature sensing device 104. Such cooking cycles(s) can then be provided to a user, e.g. via user interface 60. As such, the user interface allows the user to select a desired cooking cycle from the one or more cooking cycles that is suitable for the temperature sensing device 104 in use.

In alternative embodiments, the controller 50 is configured to determine whether a selected cooking cycle corresponds to the type of temperature sensing device 104. If the selected cooking cycle corresponds to the type of the temperature sensing device 104, the controller 50 moves forward with implementing the selected cooking cycle. Alternatively, if the selected cooking cycle does not correspond to the type of the temperature, the controller 50 is configured to implement a corrective action. For example, in such embodiments, the controller 50 is configured to prohibit the cooking cycle from commencing, allow a user to select a different cooking cycle, allow the user to change replace the temperature sensing device with a different type of temperature sensing device, or proceed with the selected (or automatically-determined) cooking cycle.

As an example, in one embodiment, the user may have at least two temperature probes available for use with the cooking appliance, e.g. a base probe and a high accuracy probe. Accordingly, the two probes require different thermistor curves. Therefore, reference data for both probes can be stored in the memory device(s) 54. As such, when the user inserts a selected probe into the food and places the cooking into the cooking appliance, such an oven appliance, the imaging device 106 collects images of the probe and compares the images to reference information. Further, as an example, the user also selects a cooking cycle that requires the high accuracy probe. In the case where the probe is identified as the high accuracy probe, the user can proceed with the cooking cycle. However, in the case where the probe is identified as the low accuracy probe, the user can be alerted to change to the high accuracy probe or choose a different cooking cycle.

Referring now to FIG. 8, a flow diagram of one embodiment of a method 200 for operating a cooking appliance according to the present disclosure is illustrated. In general, the method 200 will be described herein with reference to the cooking appliance 10 and associated features shown in FIGS. 1-7. However, it should be appreciated that the disclosed method 200 may be implemented with oven appliances having any other suitable configurations. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 includes communicatively coupling a temperature sensing device 104 with the controller 50 of the cooking appliance 10, e.g. such as by inserting the temperature sensing device 104 into a port 100 of the cooking appliance 10 or wirelessly coupling the temperature sensing device 104 with the controller 50. As shown at (204), the method 200 includes collecting, via an imaging device 106, data relating to the temperature sensing device 104. As shown at (206), the method 200 includes determining, via a controller 50 of the cooking appliance 10, a type of the temperature sensing device 104 based, at least in part, on the collected data relating to the temperature sensing device 104 from the imaging device 106. As shown at (208), the method 200 includes determining, via the controller 50, a cooking cycle for the cooking appliance 10, e.g. such as by receiving, via the user interface 60 of the cooking appliance 10, a selection of a cooking cycle for the cooking appliance 10 from a user or automatically determining the cooking cycle via the controller 50. As shown at (210), the method 200 includes determining, via the controller 50, whether the type of the temperature sensing device 104 is suitable for the cooking cycle. Thus, in certain embodiments, as shown at (212), the method 200 may also include indicating, via the user interface 60, whether the type of the temperature sensing device 104 is suitable for the cooking cycle.

As an example, the user may have two temperature probes for use with the cooking appliance 10, namely Probe A and Probe B. Probe A may have high accuracy between 100° F. and 150° F., but may not be accurate at temperatures above 180° F. Probe B may have high accuracy between 170° F. and 220° F., but may not be accurate at temperatures below 150° F. As such, the different temperature probes require different control values. If, in the example, the user is preparing a food item, such as a rare roast beef, Probe A is required for this cooking application. In a first scenario, the user may insert Probe A into the food item in the oven appliance and set a target final food temperature. The imaging device 106 then collects images of Probe A. Based on the reference information, the controller 50 determines that the user has the correct probe for this application and the proper table is identified for the cooking cycle. In a second scenario, however, the user inserts Probe B into the food item in the oven appliance and set a target final food temperature. The imaging device 106 then collects images of Probe B. Based on reference information, the controller 50 determines that the user has the incorrect probe for this cooking application. Therefore, the controller 50 alerts the user to switch probes for better accuracy.

Referring now to FIG. 9, a flow diagram of one embodiment of a method 300 for operating a cooking appliance according to the present disclosure is illustrated. In general, the method 300 will be described herein with reference to the cooking appliance 10 and associated features shown in FIGS. 1-7. However, it should be appreciated that the disclosed method 300 may be implemented with oven appliances having any other suitable configurations. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (302), the method 300 includes providing, via the user interface 60 of the controller 50 of the cooking appliance 10, one or more cooking cycles to a user. As shown at (304), the method 300 includes allowing the user to select a desired cooking cycle from the one or more cooking cycles. As shown at (306), the method 300 includes indicating, via the user interface 60, a recommended type of the temperature sensing device 104 that corresponds to the desired cooking cycle. As shown at (308), the method 300 includes receiving an indication that a temperature sensing device 104 is communicatively coupled with the cooking appliance 10. As shown at (310), the method 300 includes collecting, via an imaging device 106, data relating to the temperature sensing device 104. As shown at (312), the method 300 includes determining an actual type of the temperature sensing device 104 based, at least in part, on the collected data relating to the temperature sensing device 104 from the imaging device 106. As shown at (314), the method 300 includes confirming whether the recommended type and the actual type of the temperature sensing device 104 are the same. Moreover, in another embodiment, as shown at (316), the method 300 may include indicating, via the user interface, whether the recommended type and the actual type of the temperature sensing device are the same or whether a user should select a different temperature sensing device.

In further embodiments, the method 300 may include storing reference data relating the type of the temperature sensing device 104. Thus, in certain embodiments, the method 300 may include identifying the type of the temperature sensing device by correlating the collected data relating to the temperature sensing device from the imaging device and the stored reference data relating the type of the temperature sensing device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooking appliance assembly, comprising:
   a cooking appliance comprising a heat source for heating at least one food item;
   a temperature sensing device;
   an imaging device for collecting data relating to the temperature sensing device; and
   a controller communicatively coupled with the cooking appliance assembly, the temperature sensing device, and the imaging device, the controller comprising a memory store and at least one processor for performing a plurality of operations, the plurality of operations comprising:
   determining a type of the temperature sensing device based, at least in part, on the collected data relating to the temperature sensing device from the imaging device; and
   identifying the type of the temperature sensing device by correlating the collected data relating to the temperature sensing device from the imaging device and reference data stored in the memory store relating the type of the temperature sensing device.

2. The cooking appliance assembly of claim 1, wherein the collected data relating to the temperature sensing device comprises at least one of a structural feature of the temperature sensing device, color of the temperature sensing device, or a marker on the temperature sensing device.

3. The cooking appliance assembly of claim 1, wherein the plurality of operations further comprise:
- determining whether a selected or automatically-generated cooking cycle corresponds to the type of the temperature sensing device;
- if the selected or automatically-generated cooking cycle corresponds to the type of the temperature sensing device, implementing the selected cooking cycle; and
- if the selected or automatically-generated cooking cycle does not correspond to the type of the temperature sensing device, implementing a corrective action.

4. The cooking appliance assembly of claim 3, wherein implementing the corrective action comprises at least one of prohibiting the selected or automatically-generated cooking cycle from commencing, allowing a user to select a different cooking cycle, allowing the user to replace the temperature sensing device with a different type of temperature sensing device, automatically generating another cooking cycle, or proceeding with the selected or automatically-generated cooking cycle.

5. The cooking appliance assembly of claim 1, wherein the plurality of operations further comprise:
- identifying one or more cooking cycles that correspond to the type of the temperature sensing device;
- providing the one or more cooking cycles to a user; and
- allowing the user to select a desired cooking cycle from the one or more cooking cycles.

6. The cooking appliance assembly of claim 1, wherein the imaging device comprises a camera.

7. The cooking appliance assembly of claim 6, wherein the camera is part of a smart device.

8. The cooking appliance assembly of claim 1, wherein the cooking appliance is an oven appliance comprising a cabinet defining an oven cavity, the heat source configured to heat the cabinet.

9. The cooking appliance assembly of claim 8, wherein the imaging device is mounted within the cabinet.

10. The cooking appliance assembly of claim 1, wherein the cooking appliance is a cooktop appliance comprising one or more burners, the heat source configured to heat the one or more burners.

11. The cooking appliance assembly of claim 1, wherein the imaging device is secured above the one or more burners.

12. The cooking appliance assembly of claim 1, wherein the temperature sensing device comprises a wired or wireless temperature probe.

* * * * *